(12) United States Patent
Hanafusa et al.

(10) Patent No.: US 9,731,754 B2
(45) Date of Patent: Aug. 15, 2017

(54) WORK VEHICLE (71) Applicant: YANMAR CO., LTD., Osaka-shi, Osaka (JP)

(72) Inventors: Masahiro Hanafusa, Osaka (JP); Taihei Daiyakuji, Osaka (JP)

(73) Assignee: YANMAR CO., LTD., Osaka-Shi, Osaka (JP)

( * ) Notice: Subject to any disclaimer, the term of this patent is extended or adjusted under 35 U.S.C. 154(b) by 0 days.

(21) Appl. No.: 15/025,005

(22) PCT Filed: Sep. 29, 2014

(86) PCT No.: PCT/JP2014/075848
§ 371 (c)(1),
(2) Date: Mar. 25, 2016

(87) PCT Pub. No.: WO2015/046499
PCT Pub. Date: Apr. 2, 2015

(65) Prior Publication Data
US 2016/0272240 A1 Sep. 22, 2016

(30) Foreign Application Priority Data
Sep. 30, 2013 (JP) .................................. 2013-204705

(51) Int. Cl.
*B62D 5/12* (2006.01)
*B62D 7/10* (2006.01)

(52) U.S. Cl.
CPC .... *B62D 5/12* (2013.01); *B62D 7/10* (2013.01)

(58) Field of Classification Search
CPC ....................................................... B62D 5/12
See application file for complete search history.

(56) References Cited

U.S. PATENT DOCUMENTS 5,921,343 A 7/1999 Yamakaji

FOREIGN PATENT DOCUMENTS

| JP | 05058560 U | 8/1993 |
| JP | H107009 A | 1/1998 |
| JP | 2003081108 A | 3/2003 |
| JP | 2010116115 A | 5/2010 |

OTHER PUBLICATIONS

International Search Report corresponding to Application No. PCT/JP2014/075848; Date of Mailing: Dec. 22, 2014, with English translation.

*Primary Examiner* — Kevin Hurley
(74) *Attorney, Agent, or Firm* — Cantor Colburn LLP (57) ABSTRACT Provided is a work vehicle in which a connection member can be prevented from coming into contact with an obstacle while the work vehicle is traveling, without restricting the layout of the work vehicle. A work vehicle in which a power steering cylinder is mounted to a front axle case, wherein in the front axle case, a support part to which the power steering cylinder is mounted by a connection member, and a protruding part that protrudes from the support part so as to conceal the connection member when viewed from the front side of the work vehicle are formed.

4 Claims, 9 Drawing Sheets

WORK VEHICLE

CROSS REFERENCE TO RELATED APPLICATIONS

This is the U.S. national stage of application No. PCT/JP2014/075848, filed on Sep. 29, 2014. Priority under 35 U.S.C. §119(a) and 35 U.S.C. §365(b) is claimed from Japanese Application No. 2013-204705, filed Sep. 30, 2013, the disclosure of which is also incorporated herein by reference.

TECHNICAL FIELD

The present invention relates to a work vehicle in which a power steering cylinder is attached to a front axle casing.

BACKGROUND ART

Conventionally, in a work vehicle such as a tractor, a power steering cylinder changing a steering angle of a pair of front wheels is provided.

A main body of the power steering cylinder is attached to a front axle casing whose lengthwise direction is arranged along the transverse direction of the work vehicle. A rod of the power steering cylinder is attached to a knuckle arm or a transmission rod.

In the art disclosed in the Patent Literature 1, a fixed side (main body) of the power steering cylinder is fixed via a ball joint to a support stay extended rearward from the front axle casing.

In the art disclosed in the Patent Literature 1, a height position of the support stay or the like is adjusted so as to make the fixed part of the power steering cylinder within a range of vertical height of the front axle casing.

Namely, in the art disclosed in the Patent Literature 1, a connection member connecting the power steering cylinder is arranged behind the front axle casing so that the connection member is not projected downward from the front axle casing.

Accordingly, in the art disclosed in the Patent Literature 1, an obstacle on the ground approaching the work vehicle at traveling is prevented from contacting the connection member.

However, in the work vehicle, on account of a layout such as height position of the front axle casing and arrangement position of an engine, the support stay may be arranged at the same height as a lower end of a front axle bracket.

In this case, the connection member such as the ball joint is arranged lower than the front axle casing. Accordingly, in this case, the connection member may contact the obstacle on the ground at traveling of the work vehicle.

PRIOR ART REFERENCE

Patent Literature

Patent Literature 1: the Japanese Patent Laid Open Gazette Hei. 10-7009

DISCLOSURE OF INVENTION

Problems to be Solved by the Invention

The present invention is provided in consideration of the conditions as mentioned above, and the purpose of the invention is to provide a work vehicle in which a connection member can be prevented from contacting an obstacle at traveling of the work vehicle without any restriction of a layout of the work vehicle.

Means for Solving the Problems

According to the present invention, a work vehicle in which a power steering cylinder is attached to a front axle casing is characterized in that the front axle casing is formed therein with a support part to which the power steering cylinder is attached by a connection member, and a protruding part protruding from the support part so as to cover the connection member when viewed from the front side of the work vehicle.

According to the present invention, the protruding part is formed in the support part so as to be curved or bent toward a front side of the work vehicle.

According to the present invention, a lower end of the protruding part is extended rearward when viewed in side.

Effect of the Invention

The present invention brings the following effects.

According to the present invention, the connection member can be prevented from contacting an obstacle at traveling of the work vehicle without any restriction of the layout of the work vehicle.

According to the present invention, the connection member can be prevented from contacting an obstacle at traveling of the work vehicle more certainly.

According to the present invention, the connection member can be prevented from contacting an obstacle at traveling of the work vehicle more certainly.

DETAILED DESCRIPTION OF THE INVENTION

Next, an embodiment of the present invention is explained.

Firstly, an entire configuration of a work vehicle 1 according to an embodiment of the present invention is explained.

The work vehicle 1 of this embodiment is a tractor. However, an object to which the work vehicle according to the present invention is not limited to the tractor.

Figure 1:
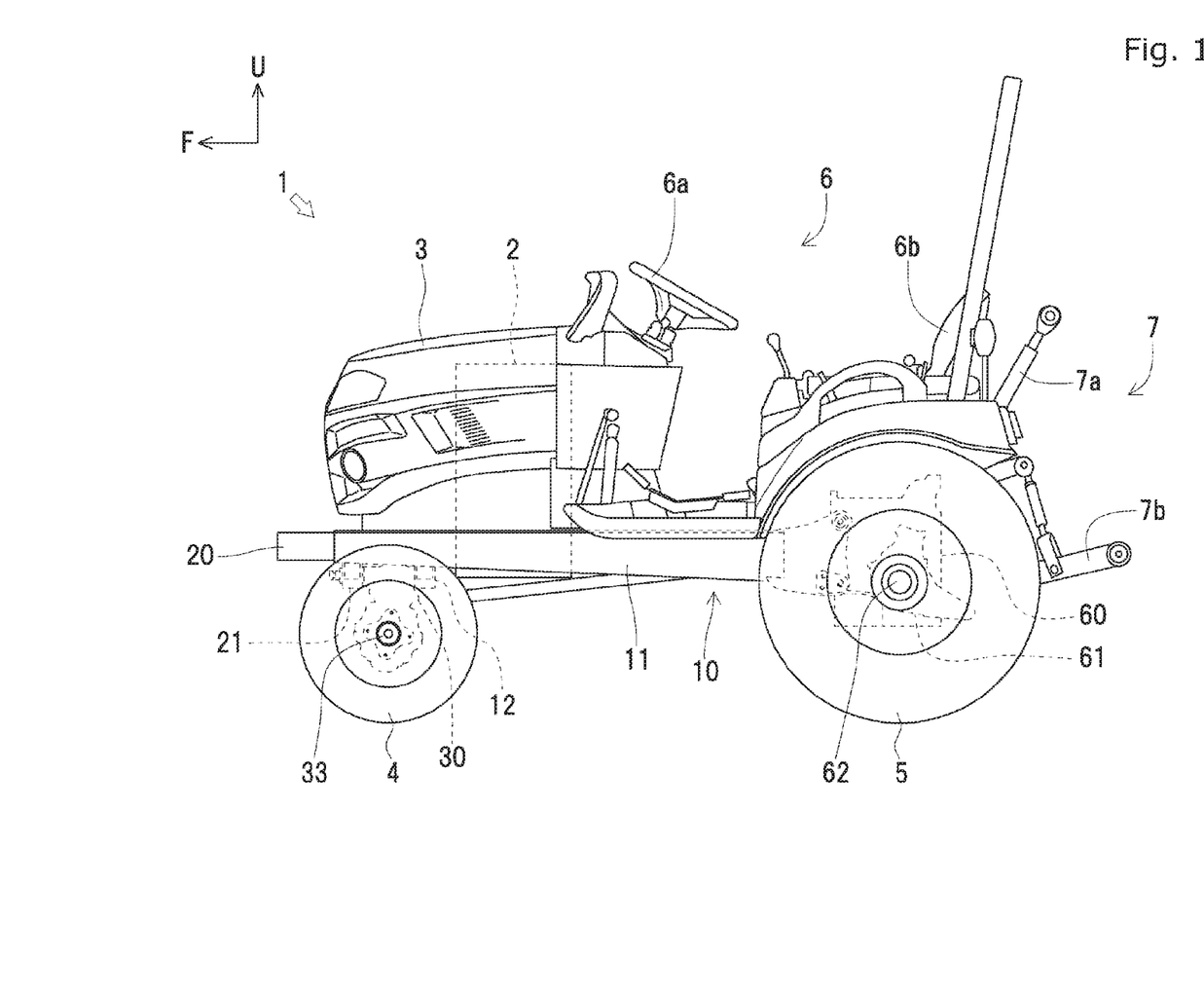
FIG. 1 is a side view of an entire configuration of a work vehicle according to an embodiment of the present invention.

Below, a direction of an arrow F in FIG. 1 is regarded as the front direction so as to specify the longitudinal direction of the work vehicle 1.

Below, a direction of an arrow U in FIG. 1 is regarded as the upper direction so as to specify the vertical direction of the work vehicle 1.

Below, a direction of an arrow L in FIG. 1 is regarded as the left direction so as to specify the lateral direction of the work vehicle 1.

As shown in FIG. 1, in the work vehicle 1, a body frame 10 is arranged so that a lengthwise direction thereof is arranged along the longitudinal direction.

The body frame 10 is configured by welding a front axle bracket 12 via a pair of reinforcement plates to a pair of beams 11 which are arranged at a predetermined interval while a lengthwise direction thereof is arranged along the longitudinal direction.

A front part of the body frame 10 supports an engine 2 via an engine bracket. The engine 2 is covered by a bonnet 3 or the like.

The front part of the body frame 10 is supported via a front axle casing 30 by a pair of front wheels 4. A rear part of the body frame 10 is supported via a transmission casing 60 and rear axle casings 61 by a pair of rear wheels 5.

In an upper part of the body frame 10, an operation part 6 is arranged. The operation part 6 has a steering wheel 6a, a seat 6b and the like.

Figure 2:
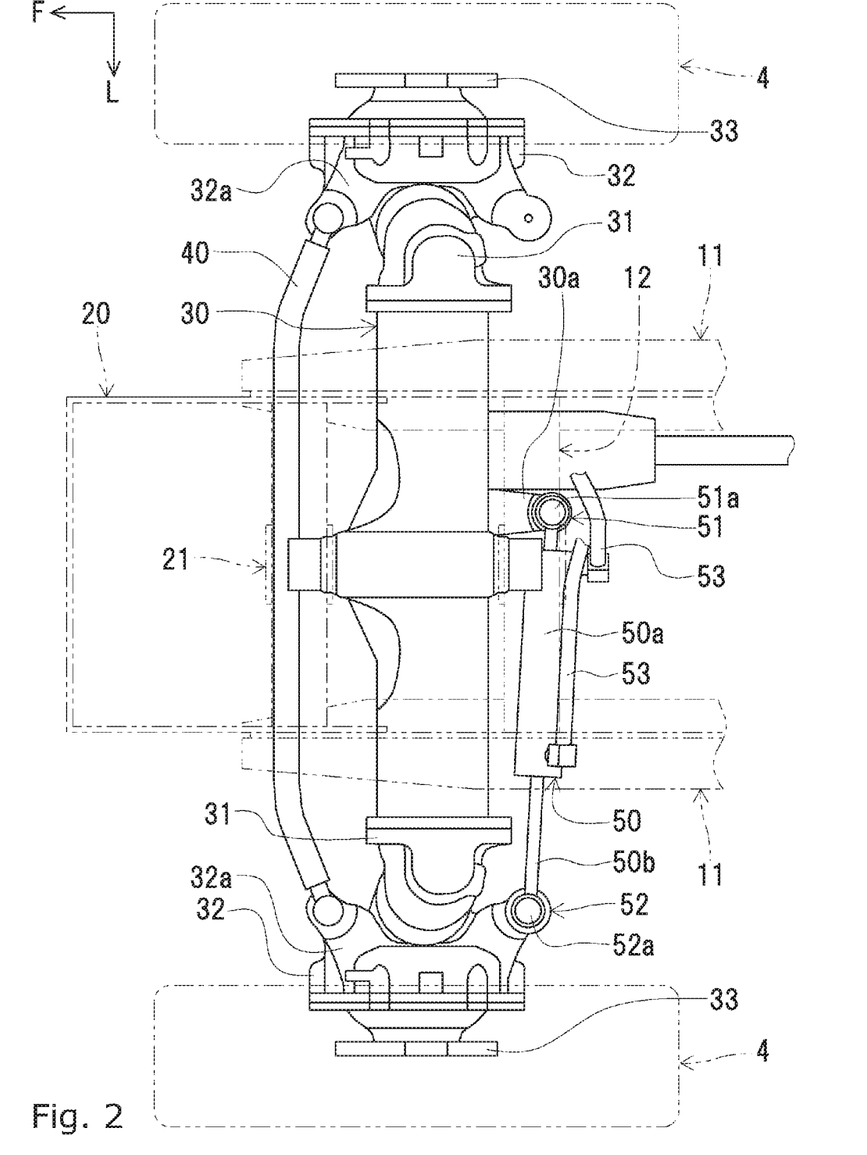
FIG. 2 is a plan view of a front axle casing.

The steering wheel 6a can change a steering angle of the front wheels 4 by a power steering cylinder 50 that a rod 50b is extended and contracted following rotation direction of the steering wheel 6a so as to steer the work vehicle 1 (see FIG. 2). The seat 6b is arranged above the rear wheels 5 so that an operator can sit thereon.

Behind the operation part 6, a work machine equipment device 7 is provided. By connecting a work machine such as a rotary tilling device to a rear end of a top link 7a and a rear end of a lower link 7b, the work machine equipment device 7 equips a rear end of the work vehicle 1 with the work machine.

In the work vehicle 1, by attaching a front hitch 20 equipped with a weight to a front end of the body frame 10, loss of weight balance in the longitudinal direction caused by equipment of the work machine is rectified.

As shown in FIGS. 1 and 2, the front hitch 20 is a platy member which is U-like shaped when viewed in plan, and a front axle bracket 21 is welded to an inner side thereof.

The front axle casing 30 is attached via the two front axle brackets 12 and 21 to the front part of the body frame 10.

The front wheels 4 are attached via a pair of front axles 33 to left and right surfaces of the front axle casing 30.

The power steering cylinder 50 is attached via connection members 51 and 52 to a rear part of the front axle casing 30.

Configurations of the front axle casing 30 and the power steering cylinder 50 are described in detail later.

As shown in FIG. 1, the transmission casing 60 in which a speed change device is provided is attached to the rear part of the body frame 10.

The top link 7a of the work machine equipment device 7 is connected rotatably to a rear part of the transmission casing 60.

A pair of rear axle casings 61 is supported respectively by left and right side surfaces of the transmission casing 60.

The rear wheels 5 are attached via a pair of rear axles 62 to the rear axle casings 61.

The lower link 7b of the work machine equipment device 7 is connected rotatably to the transmission casing 60 or the rear axle casings 61.

In the work vehicle 1, power of the engine 2 is speed-changed in the speed change device, and subsequently, the power of the engine 2 speed-changed in the speed change device can be transmitted via the front axles 33 to the front wheels 4 and can be transmitted via the rear axles 62 to the rear wheels 5.

The power of the engine 2 is transmitted to the front wheels 4 and the rear wheels 5 so as to drive rotatively the front wheels 4 and the rear wheels 5, whereby the work vehicle 1 travels.

The work vehicle 1 can transmits the power of the engine 2 speed-changed in the speed change device to the work machine. Accordingly, the work vehicle 1 drives the work machine.

Next, a configuration of the front axle casing 30 is explained.

Figure 3:
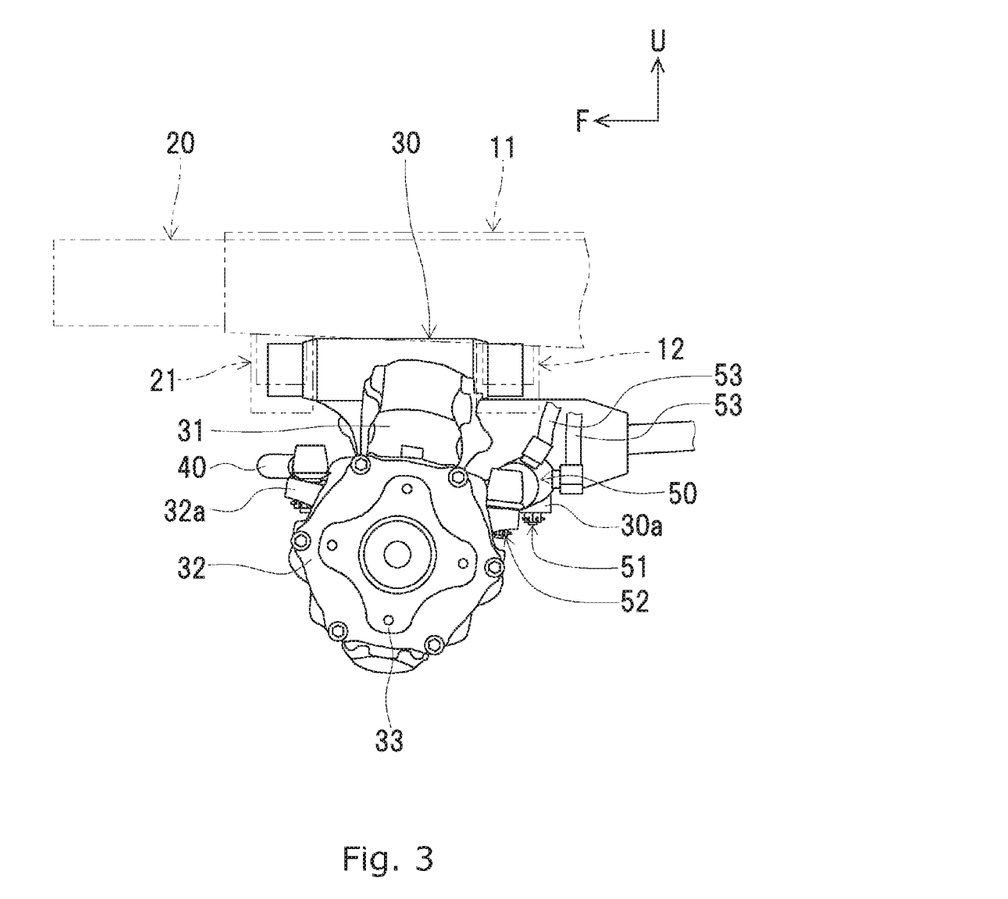
FIG. 3 is a side view of the front axle casing.

As shown in FIGS. 2 and 3, the front axle casing 30 is a substantially cylindrical member whose lengthwise direction is along the lateral direction. An axle driven by transmitting power from the engine 2 thereto and the like are housed in the front axle casing 30.

In the front axle casing 30, a shaft projected longitudinally from an upper end of a lateral center is inserted into holes formed in the two front axle brackets 12 and 21. Accordingly, the front axle casing 30 is supported by the two front axle brackets 12 and 21.

A pair of gear casings 31, a pair of gear boxes 32 and the pair of the front axles 33 are attached to the front axle casing 30.

Each of the gear casings 31 is a hollow member whose lengthwise direction is along a direction tilted slightly concerning the vertical direction. A kingpin connected to the axle in the front axle casing 30 and the like are housed in the gear casings 31.

The gear casings 31 are attached to lateral ends of the front axle casing 30.

Each of the gear boxes 32 is a hollow member whose lengthwise direction is along the lengthwise direction of the gear casings 31, that is, the direction tilted slightly concerning the vertical direction.

The gear boxes 32 are attached respectively to lower sides of lateral ends of the gear casings 31.

The gear boxes 32 are supported via the kingpin and the like so as to be rotatable relatively to the gear casings 31.

Knuckle arms 32a are formed integrally with the gear boxes 32.

The knuckle arms 32a are formed at upper sides of the gear boxes 32 and projected toward an inner side of the work vehicle 1 from front and rear sides of the gear boxes 32.

A transmission rod 40 is attached via ball joints or the like to front sides of the knuckle arms 32a of the gear boxes 32. A lateral middle part of the transmission rod 40 is extended straightly and both lateral sides thereof are extended smoothly along directions tilted concerning the lateral direction so as to connect the gear boxes 32.

The front axles 33 are attached respectively to outer sides of the gear boxes 32 and support the front wheels 4 at the outer sides of the gear boxes 32.

Next, a configuration of the power steering cylinder 50 is explained.

The power steering cylinder 50 is a hydraulic cylinder that the rod 50b is extended and contracted by supplying pressure oil to a right side (a side extending the rod 50b) or a left side (a side contracting the rod 50b) of a main body 50a.

Two pipes 53 are connected to left and right sides of the main body 50a of the power steering cylinder 50. Each of the pipes 53 communicates the main body 50a of the power steering cylinder 50 with a hydraulic pump via a switching valve provided in a middle part of the pipe 53.

The hydraulic pump is driven by power from the engine 2 and supplies pressure oil to the power steering cylinder 50. At this time, the switching valves are switched corresponding to a rotation direction of the steering wheel 6a, and the pressure oil supplied from the hydraulic pump is supplied to the left side or the right side of the main body 50a of the power steering cylinder 50.

Accordingly, the power steering cylinder 50 extends and contracts the rod 50b corresponding to the rotation direction of the steering wheel 6a.

The main body 50a of the power steering cylinder 50 is attached via the connection member 51 to the front axle casing 30.

The rod 50b of the power steering cylinder 50 is attached via the connection members 52 to a rear side of the knuckle arm 32a of the left gear box 32.

Accordingly, the power steering cylinder 50 extends the rod 50b so as to push leftward the rear side of the knuckle arm 32a of the left gear box 32. Namely, the power steering cylinder 50 rotates the left gear box 32 clockwise in FIG. 2.

At this time, the right gear box 32 is pushed rightward via the transmission rod 40 and the knuckle arm 32a.

Accordingly, the power steering cylinder 50 rotates the gear boxes 32 clockwise in FIG. 2 so as to rotate the front wheels 4 clockwise in FIG. 2.

The power steering cylinder 50 contracts the rod 50b so as to pull rightward the rear side of the knuckle arm 32a of the left gear box 32. Namely, the power steering cylinder 50 rotates the left gear box 32 counterclockwise in FIG. 2.

At this time, the right gear box 32 is pulled leftward via the transmission rod 40 and the knuckle arm 32a.

Accordingly, the power steering cylinder 50 rotates the gear boxes 32 counterclockwise in FIG. 2 so as to rotate the front wheels 4 counterclockwise in FIG. 2.

As the above, in the work vehicle 1, the steering angle of the front wheels 4 can be changed so as to steer the work vehicle 1.

Next, a configuration of attaching the power steering cylinder 50 to the front axle casing 30 is explained.

Figure 4:
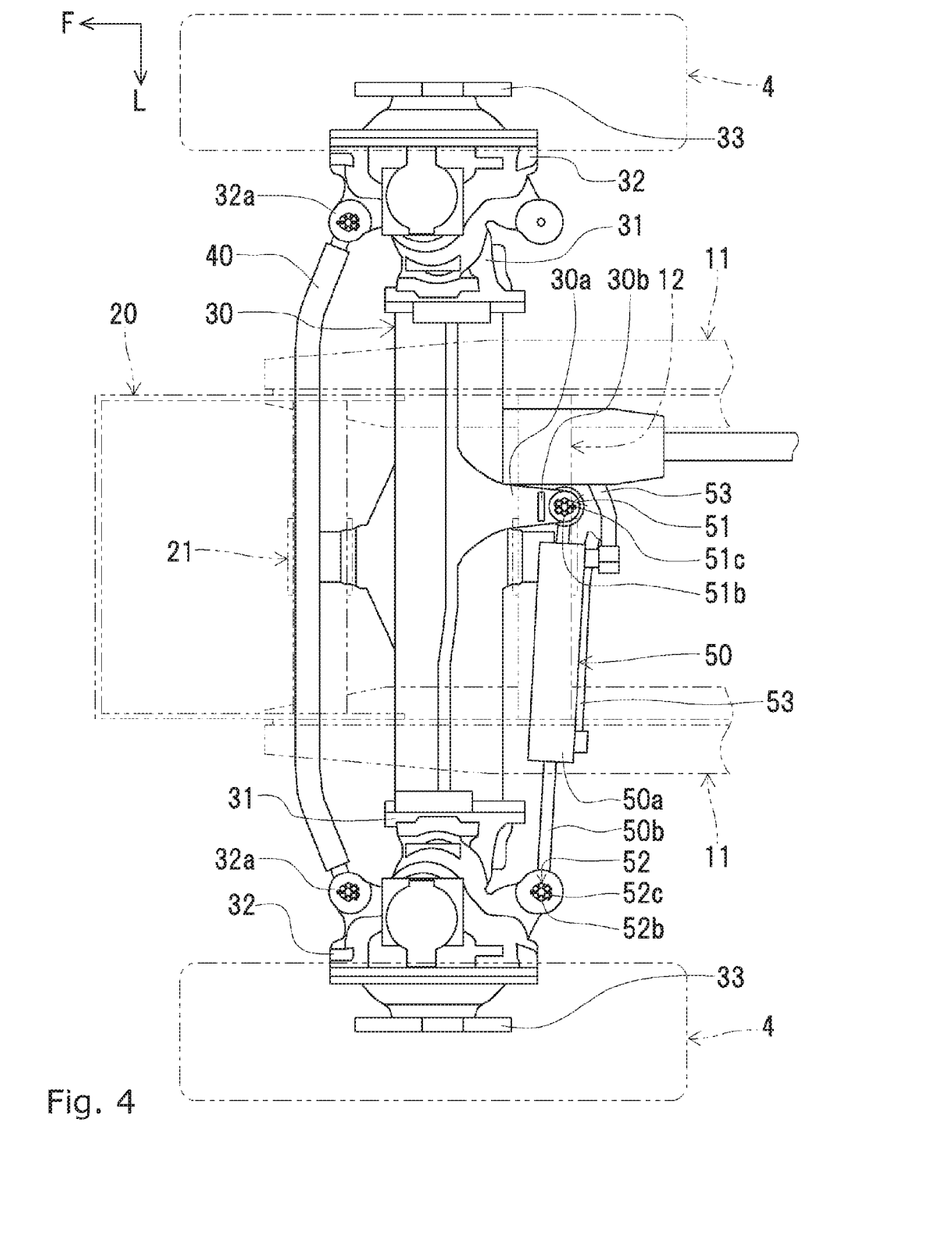
FIG. 4 is a bottom view of the front axle casing.

As shown in FIGS. 3 and 4, in the front axle casing 30, a support part 30a is formed as a part to which the main body 50a of the power steering cylinder 50 is attached.

The support part 30a is formed at a slightly right side from a lateral center of the front axle casing 30 and projected rearward from the front axle casing 30. The support part 30a of this embodiment is formed at a lower end of the front axle casing 30, and a lower surface of the support part 30a is arranged below a lower surface of the front axle casing 30.

Figure 5:
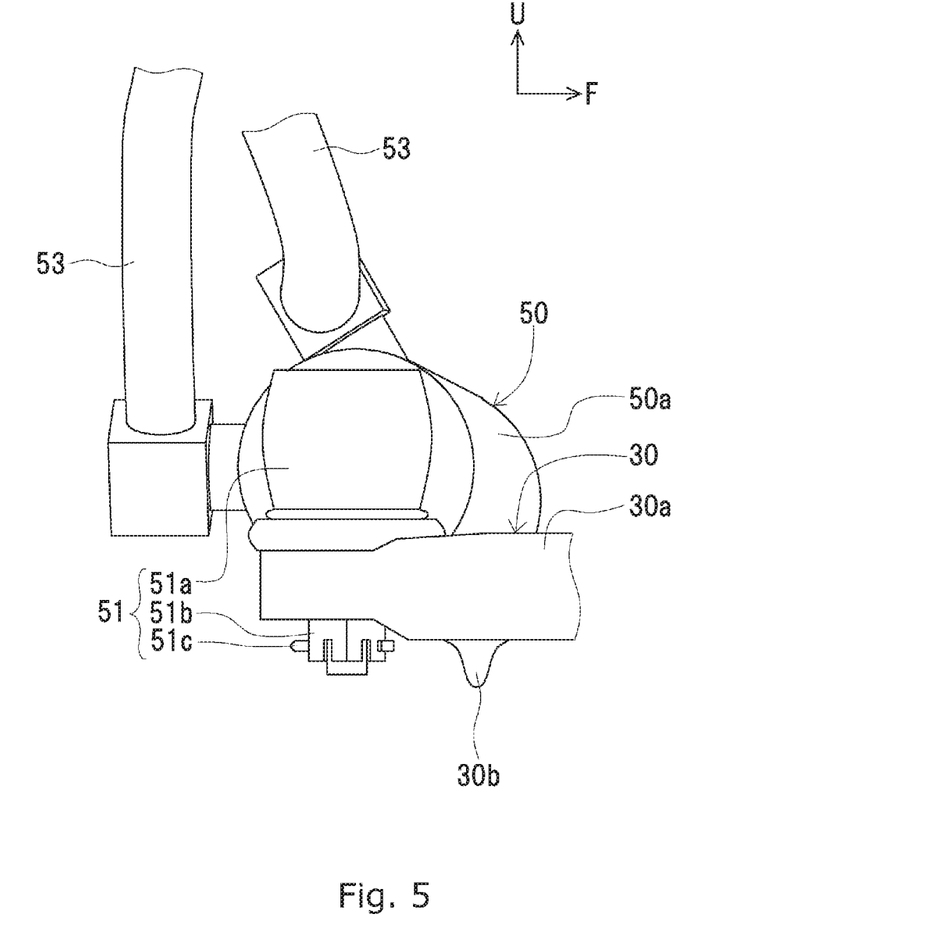
FIG. 5 is an enlarged side view of a protruding part.

A lateral width of the support part 30a becomes shorter toward a rear side and a rear end of the support part 30a is formed substantially semicircular when viewed in plan. As shown in FIGS. 4 and 5, a rear end of the lower surface of the support part 30a is arranged slightly upper than the other part thereof.

A protruding part 30b is formed at a rear side of the support part 30a.

The protruding part 30b is projected lower than the support part 30a and formed substantially rectangular when viewed in bottom while a lengthwise direction thereof is arranged along the lateral direction.

Namely, the protruding part 30b is projected lower partially than the front axle casing 30 and can be looked when viewed in front, that is, when viewed from the front side of the work vehicle 1.

The main body 50a of the power steering cylinder 50 is attached via the connection member 51 to a rear end of the support part 30a.

Figure 6:
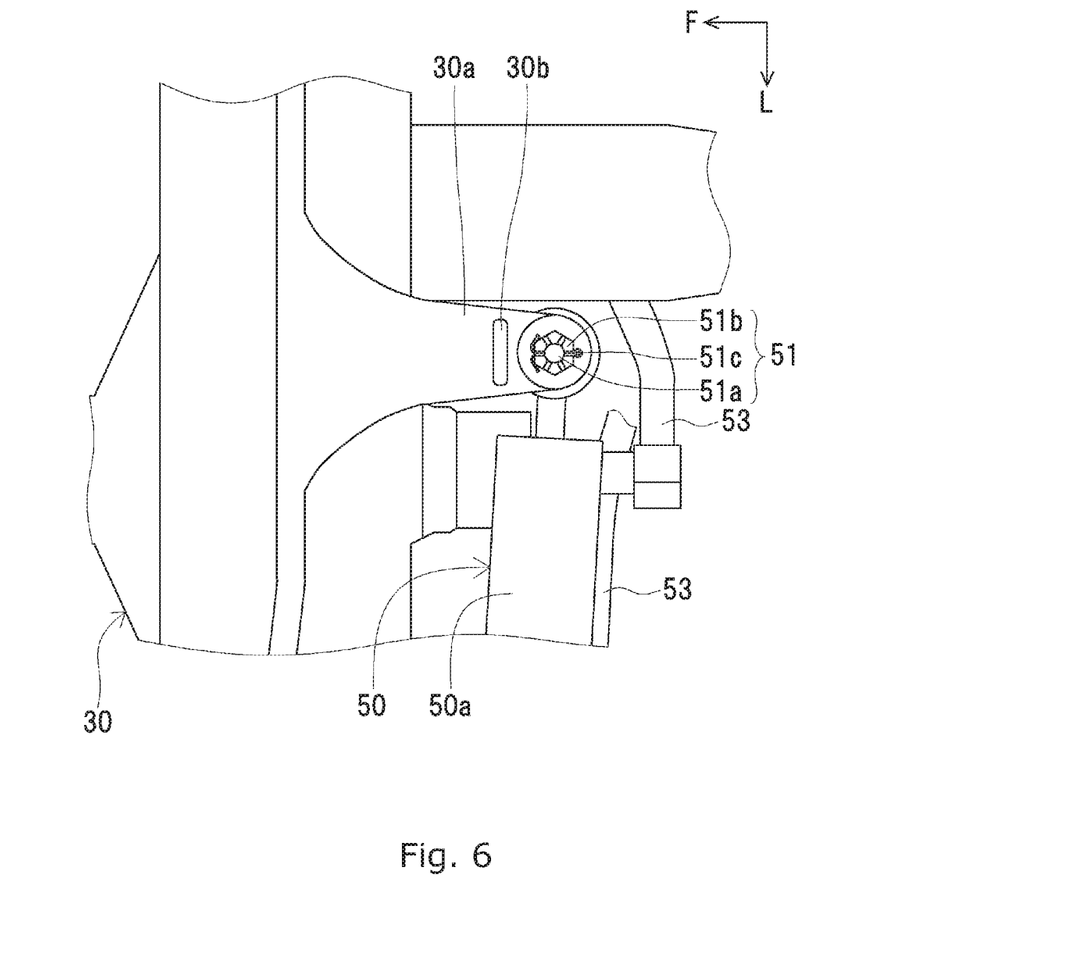
FIG. 6 is an enlarged bottom view of the protruding part.

As shown in FIGS. 5 and 6, the connection member 51 has a ball joint 51a, a lock nut 51b and a split pin 51c.

The ball joint 51a includes a ball stud whose upper end is formed spherically and an outer peripheral surface of whose lower end is formed therein with a male screw, a socket covering a spherical part of the ball stud, and the like.

A shaft part of the ball joint 51a formed integrally with a side surface of the socket is connected to the main body 50a of the power steering cylinder 50. A lower end of the ball stud of the ball joint 51a is inserted downward into a hole formed at the rear end of the support part 30a of the front axle casing 30.

A lower end of the ball joint 51a is arranged lower than the support part 30a of the front axle casing 30 so as to be projected downward over the support part 30a of the front axle casing 30.

The lock nut 51b is formed by making a plurality of notched parts in a lower part of a nut at uniform intervals while phases thereof are shifted. The lock nut 51b is attached to the lower end of the ball joint 51a.

Accordingly, the lock nut 51b is arranged below the support part 30a of the front axle casing 30.

A front end of the split pin 51c is inserted into the lock nut 51b via the notched part of the lock nut 51b and inserted into a hole formed in the lower end of the ball joint 51a.

The front end of the split pin 51c is projected former than the ball joint 51a and the lock nut 51b. The front end of the split pin 51c is bent so as to fix the ball joint 51a.

Accordingly, the split pin 51c is arranged below the support part 30a of the front axle casing 30.

As the above, the main body 50a of the power steering cylinder 50 is attached to the support part 30a by the connection member 51.

The protruding part 30b of the front axle casing 30 is arranged before the lower end of the ball joint 51a, the lock nut 51b and the split pin 51c of the connection member 51, that is, before the part of the connection member 51 arranged below the support part 30a.

The part of the connection member 51 arranged below the support part 30a is projected downward over the support part 30a when viewed in front.

Hereinafter, the part of the connection member 51 arranged below the support part 30a is referred to as "a projection part of the connection member 51".

Figure 7A:
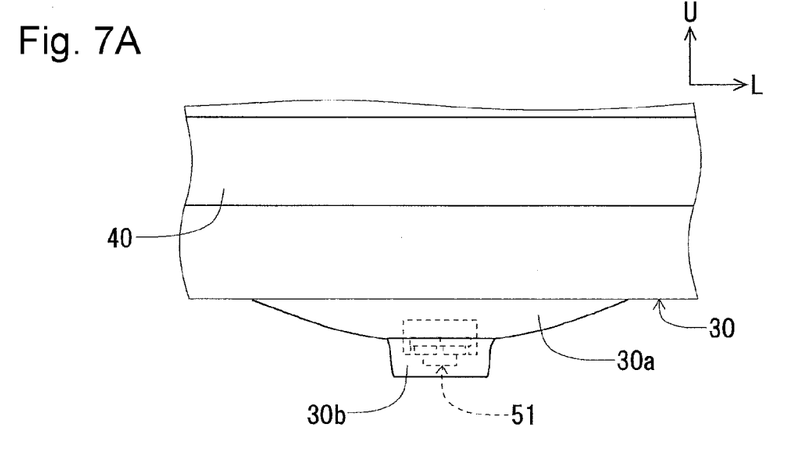
FIGS. 7A and 7B are explanatory drawings of the protruding part. 7(A) is an enlarged front view, and 7(B) is an enlarged rear view.
Figure 7B:
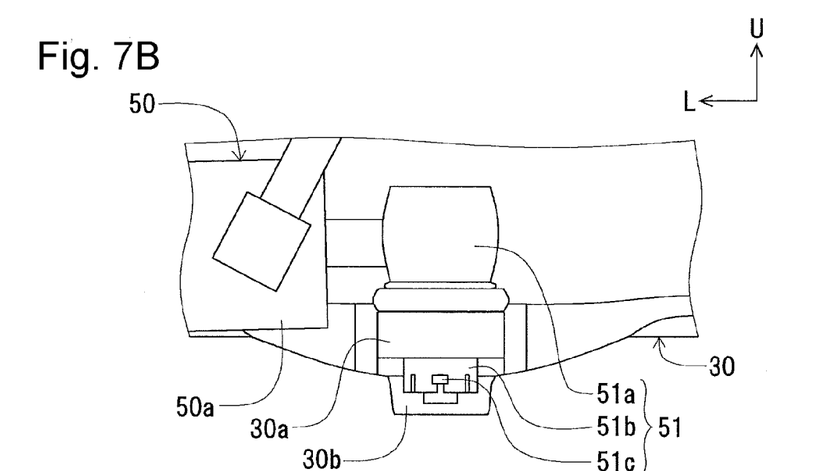

As shown in FIGS. 7A and 7B, a lower end of the protruding part 30b is arranged lower than the projection part of the connection member 51.

A left end of the protruding part 30b is arranged at the left of the projection part of the connection member 51.

A right end of the protruding part 30b is arranged at the right of the projection part of the connection member 51.

Accordingly, the projection part of the connection member 51 overlaps the protruding part 30b and cannot be seen when viewed in front (see the connection member 51 shown by dotted lines in FIG. 7(A)).

As shown in FIGS. 2 and 4, the rod 50b of the power steering cylinder 50 is attached via the connection member 52 to the rear side of the knuckle arm 32a of the left gear box 32.

The connection member 52 has a ball joint 52a, a lock nut 52b and a split pin 52c.

The ball joint 52a, the lock nut 52b and the split pin 52c are attached to the rod 50b of the power steering cylinder 50 and the rear side of the knuckle arm 32a in the same manner as the ball joint 51*a*, the lock nut 51*b* and the split pin 51*c* of the connection member 51.

At this time, the connection member 52 is arranged behind the gear casing 31 and the gear box 32.

Accordingly, the power steering cylinder 50 is arranged behind the front axle casing 30 while the lengthwise direction thereof is along a direction tilted slightly concerning the lateral direction.

As the above, in the work vehicle 1, the power steering cylinder 50 is attached to the front axle casing 30.

In the work vehicle 1, for example, when the steering angle of the front wheels 4 is changed so as to avoid collision of an obstacle and the front wheels 4 at traveling, the obstacle may touch a lower surface of the front axle casing 30.

As shown in FIGS. 7A and 7B, the projection part of the connection member 51 (the lower end of the ball joint 51*a*, the lock nut 51*b* and the split pin 51*c*) is projected downward over the support part 30*a*.

Accordingly, in the work vehicle 1, the obstacle may touch the projection part of the connection member 51 at traveling.

Then, in the work vehicle 1, the protruding part 30*b* is formed before the projection part of the connection member 51 and the obstacle is made touch the protruding part 30*b* before touching the projection part of the connection member 51 so as to protect the projection part of the connection member 51 from the obstacle.

Since the lower end of the protruding part 30*b* is arranged lower than the projection part of the connection member 51, the protruding part 30*b* can protect the connection member 51 from the obstacle certainly.

In this embodiment, the left end of the protruding part 30*b* is arranged at the left of the projection part of the connection member 51, and the right end thereof is arranged at the right of the projection part of the connection member 51.

Accordingly, when the work vehicle 1 passes the obstacle while turning, the protruding part 30*b* can protect the connection member 51 from the obstacle certainly.

Namely, in the work vehicle 1, even if the support part 30*a* is formed at the lower end of the front axle casing 30 on account of a layout and a part of the connection member 51 is projected downward over the front axle casing 30, the connection member 51 can be prevented from contacting the obstacle at traveling.

Namely, in the work vehicle 1, the connection member 51 can be prevented from contacting the obstacle at traveling without any restriction of the layout.

As the above, in the front axle casing 30 of the work vehicle 1, the protruding part 30*b* which is projected from the support part 30*a* so as to cover the connection member 51 when viewed from the front of the work vehicle 1 (when viewed in front) is formed.

Covering the connection member 51 means that the whole projection part of the connection member 51 overlaps the protruding part 30*b* and cannot be seen when viewed in front as shown in FIG. 7(A).

Namely, the shape covering the connection member 51 means the shape that the lower end is extended downward over the projection part of the connection member 51, the left end is extended leftward over the projection part of the connection member 51, and the right end is extended rightward over the projection part of the connection member 51 such as the protruding part 30*b* of this embodiment.

The shape of the protruding part is not limited to this embodiment.

Figure 8A:
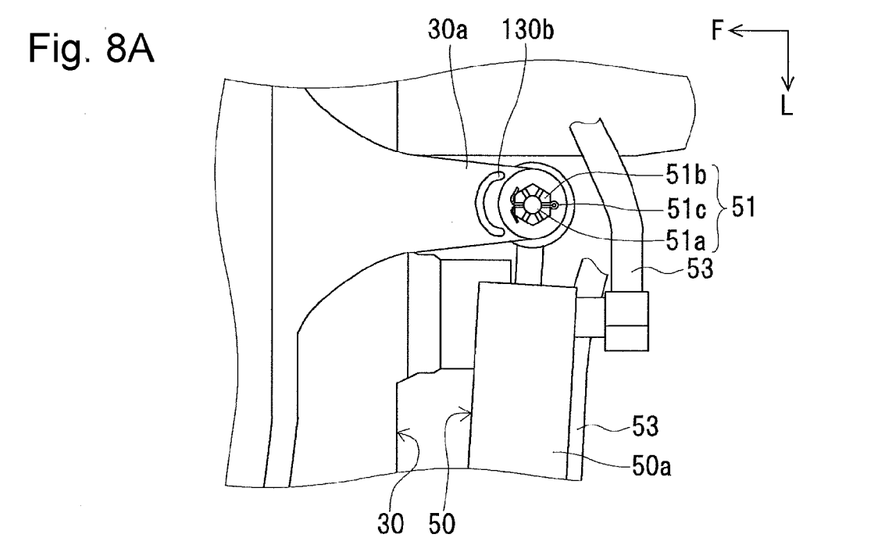
FIGS. 8A and 8B are an enlarged bottom view of a protruding part of a modification. 8(A) is a drawing of a protruding part which is substantially U-like shaped when viewed in bottom, and 8(B) is a drawing of a protruding part which is substantially V-like shaped when viewed in bottom.
Figure 8B:
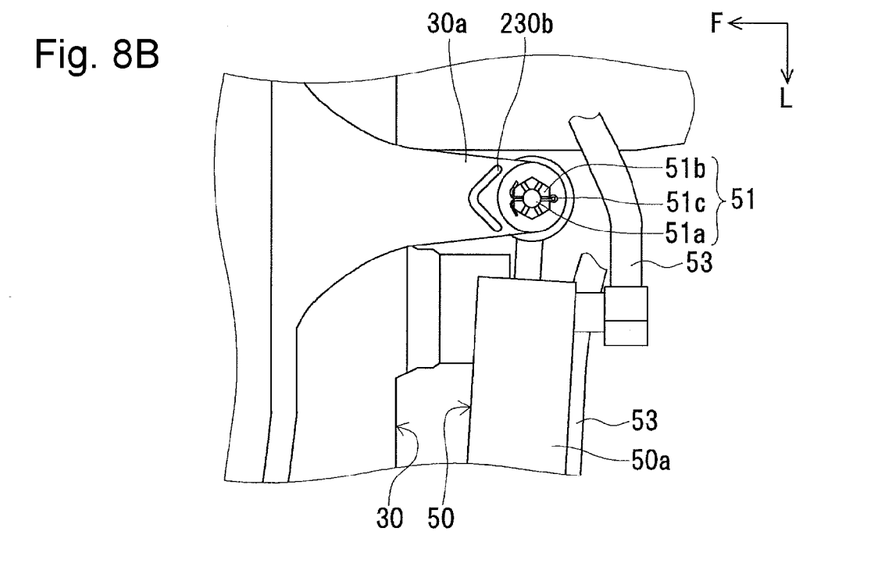

The protruding part may alternatively be substantially U-like shaped when viewed in bottom like a protruding part 130*b* shown in FIG. 8(A) or substantially V-like shaped when viewed in bottom like a protruding part 230*b* shown in FIG. 8(B).

A lateral center of the protruding part 130*b* or 230*b* is arranged former than lateral ends thereof. Namely, the protruding part 130*b* or 230*b* is substantially U-like shaped or substantially V-like shaped when viewed in bottom so that lateral width thereof is reduced toward a rear side thereof.

Accordingly, in the work vehicle 1, the obstacle colliding the protruding part 130*b* or 230*b* is guided so as to be separated from the projection part of the connection member 51.

Accordingly, in the work vehicle 1, the projection part of the connection member 51 can be protected from the obstacle more certainly, whereby the connection member 51 can be prevented from contacting the obstacle at traveling more certainly.

As the above, the protruding part 130*b* is formed in the support part 30*a* so as to be curved toward the front side of the work vehicle 1.

As the above, the protruding part 230*b* is formed in the support part 30*a* so as to be bent toward the front side of the work vehicle 1.

Figure 9:
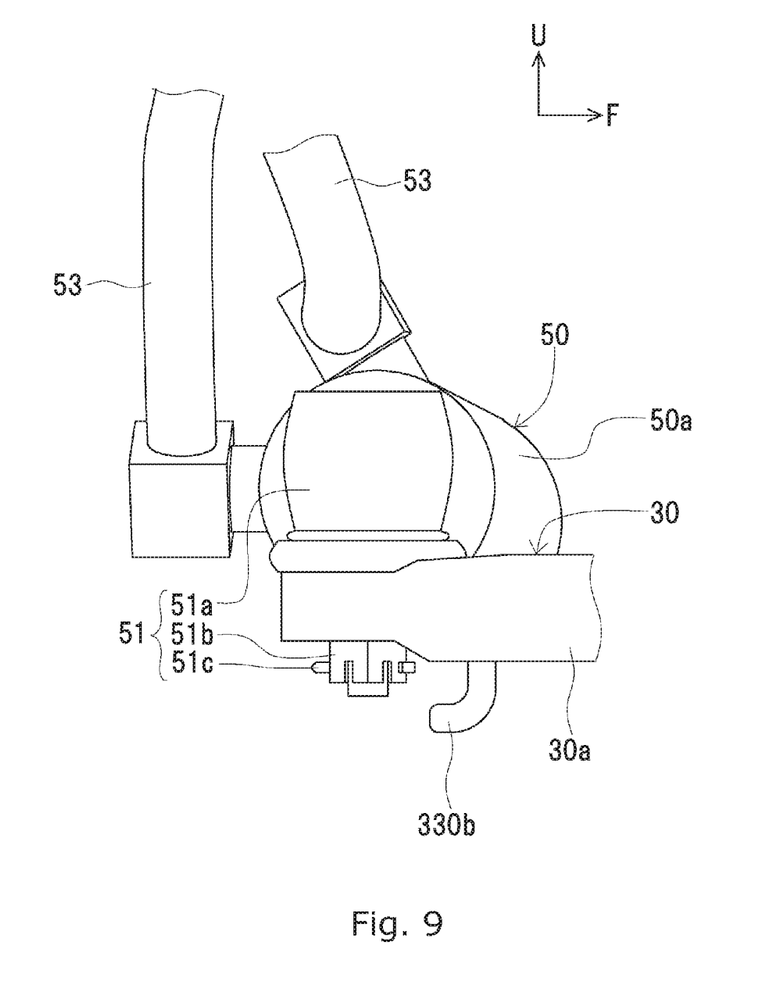
FIG. 9 is an enlarged bottom view of a protruding part of a modification which is substantially L-like shaped when viewed in bottom.

The protruding part may alternatively be substantially L-like shaped when viewed in side wherein a lower end thereof is extended rearward like a protruding part 330*b* shown in FIG. 9.

Accordingly, the protruding part 330*b* covers the projection part of the connection member 51 when viewed in side.

Accordingly, in the work vehicle 1, the projection part of the connection member 51 can be protected from the obstacle more certainly, whereby the connection member 51 can be prevented from contacting the obstacle at traveling more certainly.

INDUSTRIAL APPLICABILITY

The present invention can be used for a work vehicle in which a power steering cylinder is attached to a front axle casing.

DESCRIPTION OF NOTATIONS

1 work vehicle
30 front axle casing
30*a* support part
30*b* protruding part
50 power steering cylinder
51 connection member

The invention claimed is:

1. A work vehicle comprising:
a front axle casing; and
a power steering cylinder attached to the front axle casing,
wherein the front axle casing comprises a support part to which one end of the power steering cylinder is attached through a connection member;
the support part is disposed on a bottom end of the front axle casing such that a lower surface of the support part is arranged below a lower surface of the front axle casing;
the connection member is disposed to protrude below the support part;
a projection part of the connection member is the part of the connection member arranged below the support part;

a protruding part is downwardly formed on a bottom surface of the support part;
the protruding part is disposed in front of and below the connection member;
a left end of the protruding part of the connection member is disposed to the left of the projection part; and
a right end of the protruding part of the connection member is disposed to the right of the projection part.

2. The work vehicle according to claim 1, wherein the protruding part is formed in the support part so as to be curved or bent toward a front side of the work vehicle.

3. The work vehicle according to claim 1, wherein a lower end of the protruding part is extended rearward when viewed in side.

4. The work vehicle according to claim 2, wherein a lower end of the protruding part is extended rearward when viewed in side.

* * * * *